Patented Aug. 4, 1936

2,049,507

UNITED STATES PATENT OFFICE 2,049,507

INKS

Dorman McBurney and Edgar H. Nollau, Newburgh, N. Y., assignors to E. I. du Pont de Nemours & Company, Wilmington, Del., a corporation of Delaware No Drawing. Application May 7, 1932, Serial No. 609,977

1 Claim. (Cl. 134—36)

This invention relates to inks, and more particularly to inks suitable for printing on cellulose ester composition protective coatings, such as are applied to fabrics for binding material for books, and the like.

Ordinary printers' or lithographers' ink, which consists essentially of a treated drying oil with suitable coloring matter, does not give consistently uniform results when used for printing on cellulose nitrate or other cellulose ester coated fabrics, the greatest difficulty in such inks being the inordinate amount of time required in drying. Although the inks heretofore known can be used on other binding materials, such as book cloth and buckram, since they dry satisfactorily in from 12–16 hours, their drying is indefinitely prolonged when they are applied to cellulose ester coated fabrics. Cellulose nitrate inks have been proposed for printing on this type of bookbinding material, but such inks dry too quickly and harden or stiffen on the platen of the printing press in too short a time to be satisfactory.

An object of the present invention is to provide a suitable ink for printing or stamping on cellulose ester composition coated fabrics such as are commonly used in the bookbinding art. A further object is to provide such an ink which will dry satisfactorily in a period of from 12–16 hours and which will not harden or stiffen on the platen of the printing press for a period of approximately four hours. A further object is to provide an ink for use on cellulose ester composition coated materials which will give clear impressions, have proper covering power and will not smudge. A further and more general object is to provide an ink satisfactory for printing on other coated fabric as, for example, book cloth, buckram, and various modifications of such materials. Other objects of the invention will be apparent from the description given hereinafter.

The above objects are accomplished according to the present invention by uniformly dispersing coloring matter in a drying oil modified polyhydric alcohol-polybasic acid resin vehicle. Usually a small amount of drier will be added to the vehicle in order to obtain better drying properties.

By the term "a drying oil modified polyhydric alcohol-polybasic acid resin" as used herein is meant the reaction product of one or more polyhydric alcohols, at least one polybasic acid, and one or more drying oils or drying oil acids.

The following examples are given to illustrate suitable resins for use in the present invention:

Example 1: *Linseed oil modified polyhydric alcohol-polybasic acid resin.*—17.3 parts by weight of glycerol, 55.5 parts by weight of linseed oil acids, and 27.2 parts by weight of phthalic anhydride are heated at a temperature of 200–225° C. in a suitable receptacle fitted with a reflux condenser, stirring device, and a temperature recording instrument, until the acid number of the resulting product is less than 10.0 (acid number equals mgms. potassium hydroxide required to neutralize one gram of resin).

Example 2: *Linseed oil-Chinawood oil modified polyhydric alcohol-polybasic acid resin.*—17.0 parts by weight of glycerol, 28.0 parts by weight of linseed oil acids, 28.0 parts by weight of Chinawood oil acids, and 27.0 parts by weight of phthalic anhydride are heated at 200–225° C. in a suitable receptacle until the acid number of the resinous product is under 50.0. At this point 10–20 parts of a solvent for the resin is added in order to cool the hot reaction mixture and thus reduce the reaction rate. There is danger of excessive viscosity increase and gelation of the resin unless cooling is resorted to. The solvent added may be selected from the group comprising toluene, xylene, ethyl acetate, butyl acetate, gasoline, or like solvents, which will be obvious to those skilled in the art.

It is desirable to have a minimum of solvent present in the resins to be used in the inks of the present invention and therefore it is to be preferred to employ solvents of low vapor pressures so that the solvents can be volatilized more or less completely during the incorporation of pigments in the vehicle.

The above examples merely illustrate specific resins suitable for use in the present invention which includes within its scope all of the many modifications of the oil modified polyhydric alcohol-polybasic acid resins such as will occur to those skilled in the art. The drying oil or drying oil acids should preferably range between 45–60% by weight of the resin. Other drying oils and drying oil acids may be employed instead of linseed oil or Chinawood oil. In place of phthalic acid other polybasic acids may be used, such as succinic, adipic, suberic, and similar acids. In place of glycerol may be used numerous other polyhydric alcohols, such as glycol, diethylene glycol, polyglycerols, and the like. The preparation of this type of resin is well known in the art and the various specific ingredients mentioned herein are intended only to serve as a guide to those skilled in the art, as to the general type of resin coming within the scope of the present invention. It will be understood that the resins may be made from one or more drying oils, one or more polybasic acids, and one or more polyhydric alcohols, and likewise that two or more resins of this type may be blended to form the vehicle for carrying the coloring matter in the inks of the present invention.

The inks are prepared by mixing the dry pigment or coloring matter desired in the finished ink with the resin in order to produce a thick paste which is then ground or mixed on a standard three-roll paint grinder, or a dough mixer, or similar equipment adapted to uniformly disperse the pigment throughout the vehicle. When using a standard three-roll paint grinder, it has usually been found desirable to pass the paste over the rolls two or three times in order to obtain a perfect dispersion of the coloring matter in the vehicle.

The following examples are given to illustrate inks according to the present invention. The percentages are given by weight:—

*Example 3—Orange colored ink*

| | Percent |
|---|---|
| Chrome orange | 70 |
| Vehicle (linseed oil modified polyhydric alcohol-polybasic acid type resin) | 30 |

After the pigment has been thoroughly dispersed in the vehicle drier is added to the extent of 0.5% of metallic lead and 0.03% of metallic cobalt as the linoleates, dissolved in a small quantity of toluol. If desired, the drier can be dispersed in the pigment vehicle mixture during the grinding operation. The pigment in this ink may be varied from 50-80%, based on the total weight of the composition excluding the drier.

*Example 4—Black ink*

| | Percent |
|---|---|
| Pigment | 25 |
| Vehicle (linseed oil modified polyhydric alcohol-polybasic acid type resin) | 75 |
| Drier—same as in Example 3 | |

In this ink 100% carbon black may be used, or a mixture of 50% carbon black and 50% Prussian blue. A carbon black found to give satisfactory results is known in the trade as "Super Spectra Black."

*Example 5—White ink*

| | Percent |
|---|---|
| Pigment | 58 |
| Vehicle (as in Example 3) | 42 |
| Drier—(as in Example 3) | |

Suitable white pigments for this ink include titanium dioxide, zinc oxide, lithopone, and "Titanox", a well known commercial pigment comprising titanium dioxide and calcium or barium sulphate.

*Example 6—Blue ink*

| | Percent |
|---|---|
| Pigment | 27 |
| Vehicle (as in Example 3) | 73 |
| Drier—(as in Example 3) | |

To obtain a dark blue ink, Milori blue pigment is particularly suitable.

The above examples illustrate the use of a linseed oil modified polyhydric alcohol-polybasic acid resin. The following example illustrates the use of a mixed linseed oil-Chinawood oil modified polyhydric alcohol-polybasic acid resin:

*Example 7*

| | Percent |
|---|---|
| Pigment | 25 |
| Vehicle (25% linseed oil-Chinawood oil modified polyhydric alcohol-polybasic acid resin and 75% linseed oil modified polyhydric alcohol-polybasic acid resin) | 75 |
| Drier—(as in Example 3) | |

It will be understood that the above examples are given merely to illustrate specific inks coming within the scope of this invention. As will be understood by those skilled in the art, the proportion of pigment may be varied widely, although it is preferred that it should amount to 20–80% by weight of the composition excluding the drier. The proportion of drier in all cases is relatively small, in the case of lead linoleate ranging usually from 0.16–2% by weight of the composition, and in the case of cobalt linoleate from 0.015–0.12% by weight of the composition, the percent of drier in each instance being calculated on the weight of metallic lead or cobalt employed. Obviously other driers may be employed, such as resublimed litharge, which may be used in amounts from 0.5–1.5% by weight of the total composition.

If desired, the inks can be treated with organic volatile solvents, such as benzol and toluol, but in most instances it is preferable to use the inks in their original consistency, which has been found in practice to yield highly satisfactory results. Likewise, the inks may be thinned with clear vehicle in order to obtain the exact consistency desired to meet the particular conditions existing in individual cases.

The ink composition of the present invention is primarily designed for printing, either in letter or in block, on cellulose derivative composition coated fabrics, and particularly for printing on cellulose nitrate composition coated fabrics used in the bookbinding industry. However, the invention is not limited to the use of the ink compositions for this purpose, since they are suitable for use in printing on other bookbinding materials, such as book cloth, buckram, and in fact, on all surfaces in any way adapted to receive printing.

An advantage of the inks provided by the present invention resides in the fact that they will dry tack-free in 12–16 hours on a cellulose derivative composition coated surface and yet will not become hard or stiff on the platen of a printing press in less than about four hours' time. A further advantage of the present invention is that it provides inks which will give a clear impression, good covering power, and a satisfactory bond. A further advantage is that these inks deposit a tough film which does not crack or flake, and, furthermore, possess satisfactory properties for use on the press platen under the usual working conditions met in the usual commercial bindery.

As many apparently widely different embodiments of this invention may be made without departing from the spirit and scope thereof, it is to be understood that the invention is not limited to the specific embodiments thereof except as defined in the appended claims.

We claim:

An ink in a dispersed state and solvent-free for printing on fabrics coated with a cellulose ester composition, said ink consisting essentially of approximately 20 to 80% by weight of pigment, 0.015 to 2.0% drier, the remainder being polyhydric alcohol-polybasic acid resin and drying oil, the drying oil amounting to from 45 to 60% of the resin, said ink having a tack-free drying time of about 12 to 16 hours and which will remain plastic on the platen of a press up to about 4 hours.

DORMAN McBURNEY.
EDGAR H. NOLLAU.